No. 791,624. PATENTED JUNE 6, 1905.
M. C. HORTON.
SALAD DRESSING MIXER AND DROPPER.
APPLICATION FILED FEB. 25, 1905.

Witnesses

Inventor
Mary C. Horton.
By James J. Sheehy
Attorney

No. 791,624. Patented June 6, 1905.

UNITED STATES PATENT OFFICE.

MARY C. HORTON, OF WOONSOCKET, RHODE ISLAND.

SALAD-DRESSING MIXER AND DROPPER.

SPECIFICATION forming part of Letters Patent No. 791,624, dated June 6, 1905.

Application filed February 25, 1905. Serial No. 247,297.

*To all whom it may concern:*

Be it known that I, MARY C. HORTON, a citizen of the United States, residing at Woonsocket, in the county of Providence and State of Rhode Island, have invented new and useful Improvements in Salad-Dressing Mixers and Droppers, of which the following is a specification.

My invention pertains to mixing devices; and it contemplates the provision of a device designed more especially for facilitating the mixing of salad-dressing and assuring the proper commingling of the ingredients entering into the same.

With the foregoing in mind the invention will be fully understood from the following description and claim when taken in connection with the accompanying drawings, forming part of this specification, in which—

Figure 1:
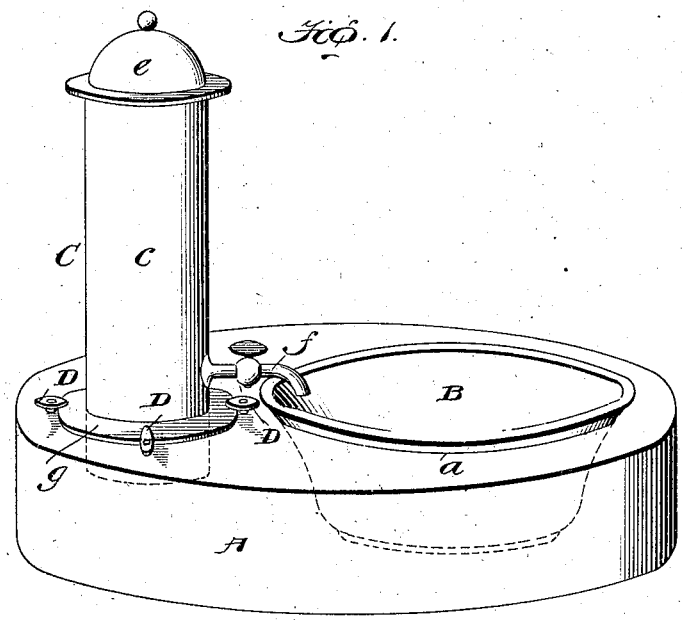
Figure 2:
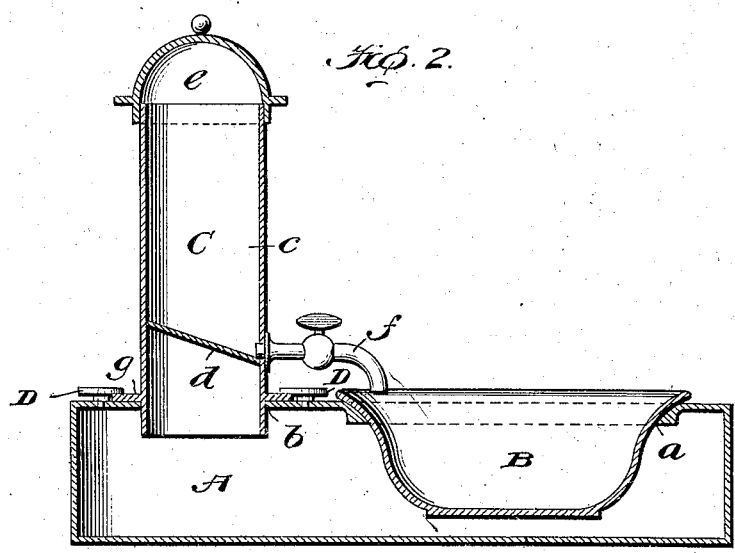

Figure 1 is a perspective view of the device constituting the present and preferred embodiment of my invention, and Fig. 2 is a longitudinal vertical section of the same.

Similar letters designate corresponding parts in both views of the drawings, referring to which—

A is the base or stand of my novel mixing device, which may be formed of cast metal, sheet metal, or other material compatible with the purpose of my invention and is preferably made sufficiently heavy to lessen the liability of it being casually moved on a table or other support incident to a mixing operation. The said base or stand is provided in its upper wall with a seat $a$ to receive a bowl B and a seat $b$ to receive a holder and dropper C for olive-oil. The holder and dropper C, which, as stated, is designed to contain olive-oil, comprises a body $c$, open at its upper end and having an inclined bottom $d$, a removable cover $e$, and a faucet $f$, which communicates with the interior of the body $c$ at a point immediately above the lowermost portion of the bottom $d$ and is arranged, as shown, to discharge into the bowl B. The said olive-oil holder and dropper further comprises an exterior flange $g$, disposed about the proportional distance illustrated above the lower end of its body $c$. This flange $g$ is adapted to rest on the base or stand A, around the seat $b$ therein, and be engaged by a plurality of turn-buttons D, pivoted on the base or stand after the manner illustrated in Fig. 2. In virtue of this manner of connecting the holder and dropper C to the base or stand A it will be observed that there is no liability of the holder and dropper being tipped over or otherwise displaced during the mixing of salad in the bowl B, and yet when desired said holder and dropper may be readily disconnected from the base or stand to facilitate cleaning of the former.

In the practical use of my novel device the eggs to be included in a salad-dressing are placed in the bowl B, and the olive-oil or analogous ingredient is placed in the holder C and the valve of the faucet $f$ is opened sufficiently to assure the olive-oil dropping into the bowl at intervals. Incident to the dropping of the oil into the bowl the mixture is worked through the medium of a spoon or other device, and at proper intervals vinegar and lemon are added to the mixture from separate receptacles, which I have deemed it unnecessary to illustrate. After the valve of the faucet $f$ is opened to assure the proper dropping of olive-oil into the mixture the operator has but to work the mixture and see to the proper adding of the vinegar and the lemon. This will be appreciated as a highly important advantage when it is remembered that it is essential to add olive-oil piecemeal to a salad-dressing in order to assure the oil mixing properly with the other ingredients and prevent the loss of all the ingredients and the time expended in making an unsuccessful attempt to produce a palatable dressing.

In addition to the advantages hereinbefore ascribed to my novel device it will be noticed that the same is simple and inexpensive in construction, is durable, and is adapted to be quickly cleaned with but a minimum amount of effort.

While my novel device is designed more especially for the mixing of salad-dressing, it may obviously be used to advantage in the mixing of other compounds.

I have specifically described the construction and relative arrangement of the parts included in the present and preferred embodiment of my invention in order to impart a definite understanding of the said embodiment. I do not desire, however, to be understood as confining myself to the said specific construction and relative arrangement of parts, as such changes or modifications may be made in practice as fairly fall within the scope of my invention as claimed.

Having described my invention, what I claim, and desire to secure by Letters Patent, is—

A mixing device comprising a base or stand having two seats in its upper side, a bowl arranged in one seat, and a combined holder and dropper for olive-oil, made up of a body arranged in the other seat and having an inclined bottom and an exterior horizontal flange bearing on the upper side of the base or stand, and a valved faucet communicating with the interior of the body and arranged to discharge into the bowl, and turn-buttons carried by the base or stand and arranged to be swung to and from a position above the horizontal flange on the body of the combined holder and dropper.

In testimony whereof I have hereunto set my hand in presence of two subscribing witnesses.

MARY C. HORTON.

Witnesses:
GEO. W. SPAULDING,
EDGAR L. SPAULDING.